US012094673B2

(12) United States Patent
Hoffmann et al.

(10) Patent No.: US 12,094,673 B2
(45) Date of Patent: Sep. 17, 2024

(54) RELAY

(71) Applicant: TDK Electronics AG, Munich (DE)

(72) Inventors: Robert Hoffmann, Berlin (DE); Jonas Weinhardt, Berlin (DE)

(73) Assignee: TDK Electronics AG, Munich (DE)

( * ) Notice: Subject to any disclaimer, the term of this patent is extended or adjusted under 35 U.S.C. 154(b) by 544 days.

(21) Appl. No.: 16/956,406

(22) PCT Filed: Dec. 4, 2018

(86) PCT No.: PCT/EP2018/083503
§ 371 (c)(1),
(2) Date: Jun. 19, 2020

(87) PCT Pub. No.: WO2019/120988
PCT Pub. Date: Jun. 27, 2019

(65) Prior Publication Data

US 2021/0012987 A1 Jan. 14, 2021

(30) Foreign Application Priority Data

Dec. 21, 2017 (DE) ........................ 102017130985.3

(51) Int. Cl.
*H01H 50/54* (2006.01)
*H01H 47/00* (2006.01)
*H01H 50/02* (2006.01)
*H01H 50/18* (2006.01)
*H01H 50/64* (2006.01)

(52) U.S. Cl.
CPC ........ *H01H 47/002* (2013.01); *H01H 50/023* (2013.01); *H01H 50/18* (2013.01); *H01H 50/546* (2013.01); *H01H 50/641* (2013.01)

(58) Field of Classification Search
CPC ........................... H01H 50/546; H01H 50/641
USPC ........................................................ 335/131
See application file for complete search history.

(56) References Cited

U.S. PATENT DOCUMENTS 2,378,162 A * 6/1945 Stapleton ............... H01H 50/30 335/131
2,531,025 A * 11/1950 Bradley ............... H01H 50/305 335/131
5,163,175 A * 11/1992 Mori ...................... H01H 89/08 335/132
5,680,084 A * 10/1997 Kishi .................. H01H 50/641 335/151

(Continued)

FOREIGN PATENT DOCUMENTS

CN 1134031 A 10/1996
CN 1210354 A 3/1999

(Continued)

*Primary Examiner* — Alexander Talpalatski
(74) *Attorney, Agent, or Firm* — Slater Matsil, LLP

(57) ABSTRACT

A relay is disclosed. In an embodiment a relay includes a first switching contact having a first main contact, a second main contact and a first movable contact; a second switching contact having a third main contact, a fourth main contact and a second movable contact, wherein the second switching contact is electrically isolated from the first switching contact; and an actuator configured to move both the first and second movable contacts from a first switching state into a second switching state by moving a drive element of the actuator from a first position into a second position.

18 Claims, 3 Drawing Sheets

(56) References Cited

U.S. PATENT DOCUMENTS

| | | | | |
|---|---|---|---|---|
| 5,828,196 | A | 10/1998 | Hetzmannseder | |
| 6,084,488 | A * | 7/2000 | Macbeth | H01H 50/546 335/132 |
| 6,837,729 | B2 * | 1/2005 | Hogue | H01H 1/18 200/243 |
| 7,760,055 | B2 * | 7/2010 | Adunka | H01H 3/001 335/8 |
| 8,232,499 | B2 | 7/2012 | Bush et al. | |
| 2012/0090165 | A1 | 4/2012 | Yeon | |

FOREIGN PATENT DOCUMENTS

| | | | |
|---|---|---|---|
| CN | 102568933 | A | 7/2012 |
| CN | 102612724 | A | 7/2012 |
| DE | 3432230 | A1 | 3/1986 |
| DE | 3506857 | A1 | 8/1986 |
| DE | 3509034 | A1 | 9/1986 |
| EP | 2218086 | B1 | 1/2012 |
| FR | 2838556 | A1 | 10/2003 |
| JP | 2014110095 | A | 6/2014 |

* cited by examiner

RELAY

This patent application is a national phase filing under section 371 of PCT/EP2018/083503, filed Dec. 4, 2018, which claims the priority of German patent application 102017130985.3, filed Dec. 21, 2017, each of which is incorporated herein by reference in its entirety.

TECHNICAL FIELD

A relay is a remotely-actuated switch that is driven by electrical current and acts in an electromagnetic manner. The relay is activated via a control circuit and may switch a load circuit. A relay for high-powered circuits is also referred to as a contactor or power contactor.

BACKGROUND

Power contactors are electrically-driven, remotely-actuated switches. They have a control circuit that may switch a load circuit in and out. One possible application of power contactors is to open and disconnect battery circuits in motor vehicles, for example, hybrid vehicles (HEV), plug-in hybrid vehicles (PHEV), all-electric vehicles (BEV). In this case, in general both a positive and also a negative contact of the battery are disconnected with the aid of a power contactor.

This disconnecting procedure is performed while the vehicle is at a standstill but also in the event of a malfunction, for example, in the event of an accident or similar. In this case, it is the main task of the power contactor to disconnect the vehicle from the power and to interrupt the current flow.

An extended scope of the above mentioned contactor represents a double contactor ("double pole single throw", DPST), whereby it is possible using a control circuit to simultaneously close or open one or multiple load circuits at two sites.

A double contactor is described in European Patent No. EP 2218086 B1. It comprises a first switching contact having a first and a second main contact and having a first movable contact and the double contactor comprises a second switching contact having a third and a fourth main contact and having a second movable contact. It is possible by means of the movable contacts to close and open the switching contacts. This occurs in each case in a parallel manner since both movable contacts are connected to one another in a mechanically rigid manner. It is possible during the switching procedure for switching sparks to occur that may result in the switching contacts becoming so hot that they become welded. In the event that only one switching contact becomes welded, both switching contacts therefore remain in the closed state by means of the mechanically rigid connection of the movable contacts, even if the control circuit is switched out, which in the normal operating mode would cause the switching contacts to open. In this event, the use of a double contactor in contrast to two single contactors impairs the safety aspect since in the case of the single contactor the probability is higher that at least one contactor opens.

SUMMARY

Embodiments relate to a relay that comprises a first switching contact having a first and a second main contact and having a first movable contact and the relay comprises a second switching contact having a third and a fourth main contact and having a second movable contact, wherein the second switching contact is electrically isolated from the first switching contact. Moreover, the relay comprises an actuator that is configured so as in a normal operating mode in which the movable contacts and the main contacts are not permanently connected to one another to move both the first and also the second movable contact from a first switching state into a second switching state in that a drive element of the actuator is moved from a first position into a second position. In the first switching state, the first movable contact is coupled in an electrically conductive manner between the first and the second main contact, and in the first switching state the second movable contact is coupled in an electrically conductive manner between the third and the fourth main contact. In the second switching state, the first movable contact is electrically isolated from the first and the second main contact and in the second switching state the second movable contact is electrically isolated from the third and fourth main contact. The actuator is configured so as in the event of a fault in which one of the movable contacts is permanently connected to one of the main contacts, to move the other movable contact from the first into the second switching state in that the drive element is moved from the first position in the direction of the second position.

This relay offers a structural solution to the one-sided opening of a double contactor in the event of the other contact becoming welded. It is possible for the same or for two different load circuits to become connected to the main contacts of the switching contacts. They may be purposefully interrupted by means of a control circuit that is connected to the actuator via control contacts. The actuator may be configured with a coil, switchable from an idle state into a state in which current is flowing, wherein the position of the drive element depends upon the state of the coil. Other conventional actuators may be pneumatic cylinders or cam shafts (mechanical).

Such a relay in particular in the form of a contactor is suitable for protecting a load circuit at two sites that are connected to the first and second switching contact. The load circuit is disconnected for both switching contacts simultaneously insofar as the relay is in the normal operating mode in which the movable contacts may open and close the switching contacts. A fault usually occurs by virtue of one of the main contacts becoming welded to one of the movable contacts as a result of switching sparks. If as a result of switching sparks one of the movable contacts becomes welded to the main contact during the opening or closing procedure, it is still always possible to open the other movable contact.

In an embodiment, a contact carrier is coupled to the drive element by a first arm on which the first movable contact is arranged and by a second arm on which the second movable contact is arranged, with the result that in the normal operating mode during the transition from the first position into the second position the arms are coupled to the movement of the drive element. In other words: a movement of the drive element causes the arms to move. As a result, the movable contacts are moved away from the main contacts. In the event of a fault, with the transition from the first position in the direction of the second position the arm on which the movable contact permanently connected to one of the main contacts is arranged is decoupled from the movement of the drive element. In other words; a movement of the drive element does not cause this arm to move, the arm being held in its position via the welded movable contact. Nonetheless, the other movable contact may be moved away from the main contacts.

In an embodiment, in the normal operating mode during the transition from the first position into the second position, the drive element and the contact carrier with the first and the second arm perform a linear movement.

Two different embodiments render it possible in the event of one of the movable contacts becoming welded, also referred to clearly as an adhered state, to open the other movable contact while the control circuit is switched off.

In an embodiment, the two movable contacts may each be rotatably coupled to a carrier body that is used as a connecting piece and is in turn rotatably connected to the shaft-shaped drive part that is moved by means of an electromagnet so as to close the switching contacts. By virtue of the rotatable mounting arrangement, it is possible to move one movable contact back into the open state in the event of the other movable contact becoming welded.

In such an embodiment, the drive element and a carrier body of the contact carrier on which the arms are arranged are coupled via a joint with the result that in the normal operating mode they perform a linear movement and in the event of a fault the carrier body performs a rotational movement with the linear movement of the drive element. The arms are mounted in such a manner that they perform a counter movement to the rotational movement of the carrier body. This may be realized in that the arms are coupled to the carrier body via in each case a swivel joint. This prevents the arms tilting in the event of a fault with the result that the non-welded contact may be moved in the desired manner.

In an alternative embodiment, the arms having the movable contacts are guided in each case in a carrier body that is used as the connecting element, wherein this may push the arms having the movable contacts through to the main contacts. However, it is not possible for the connecting element to pull on the arms having the movable contacts. Consequently, the connecting element and thus the non-adhered more specifically non-welded movable contact may then also be moved away from the main contacts of the relay if the other movable contact is welded to the main contacts.

In such an embodiment, the arms are mounted in such a manner that they may be deflected in a linear manner during the transition from the first position into the second position but not during the transition from the second position into the first position. In the event of a fault, the arm on which the movable contact permanently connected to one of the main contacts is arranged does not follow or does not completely follow the linear movement of the drive element.

In an embodiment, the arms are coupled to the carrier body in an extendible manner. The arms may be coupled, in each case, to the carrier body via a sliding joint. A spring acts against the deflection of the arm in order to hold the arm in the normal operating mode in its position relative to the carrier body.

An embodiment of the relay comprises a gas-tight housing in which the movable contacts are arranged. Contactors in this application field are generally gas-filled, in other words hermetically sealed with respect to the environment.

BRIEF DESCRIPTION OF THE DRAWINGS

The invention is exemplified below with the aid of the drawing in the following figures.

DETAILED DESCRIPTION OF ILLUSTRATIVE EMBODIMENTS

Figure 1:
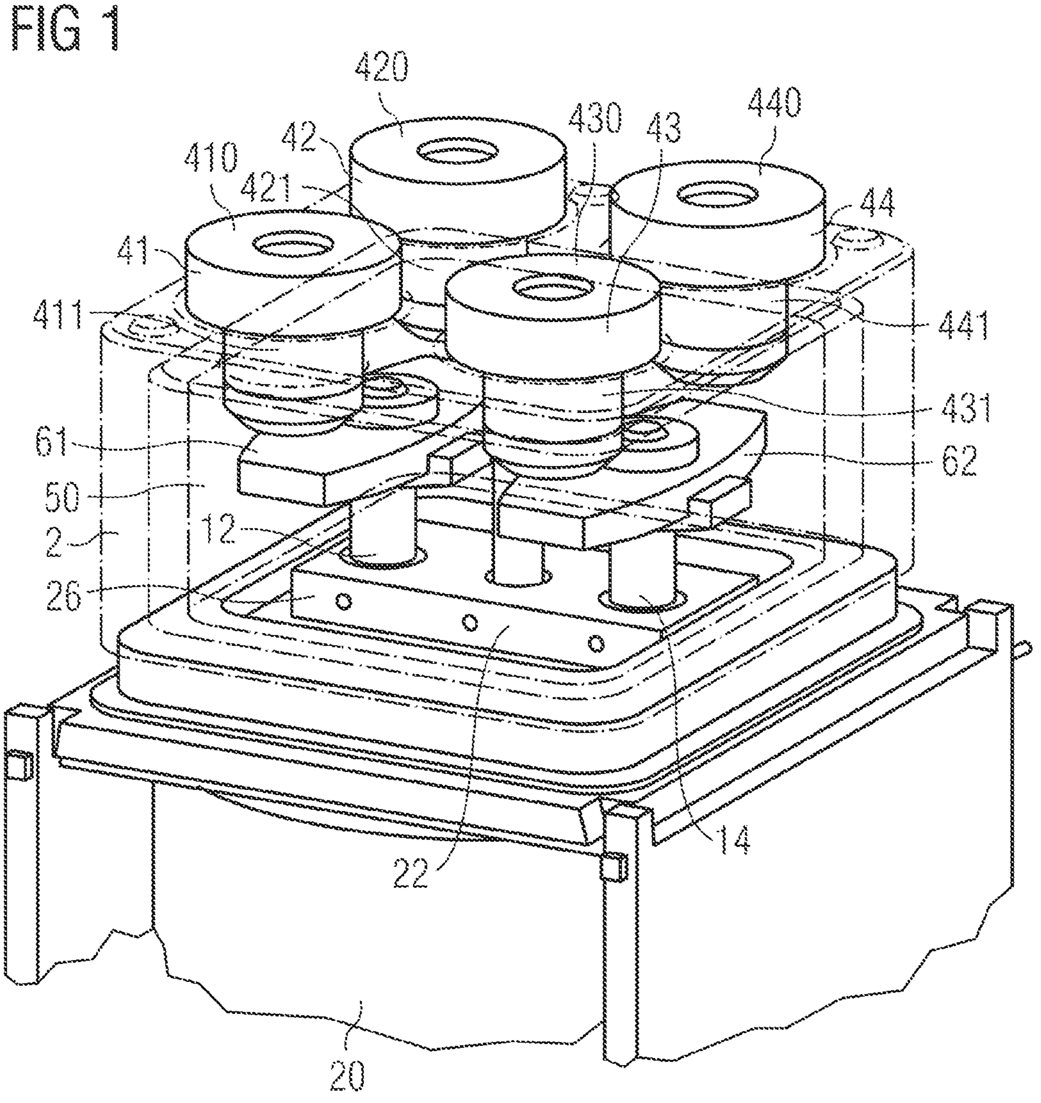
FIG. 1 illustrates a three dimensional view of a double contactor as an embodiment of a relay.

FIG. 1 illustrates a three dimensional view of a double contactor as an embodiment of a relay.

The contactor comprises a housing 2 with four main contacts 41, 42, 43, 44 arranged on its upper face. The main contacts 41, 42, 43, 44 are fixedly connected to the housing 2 and have an outer contact region 410, 420, 430, 440 to which are connected the load circuit or the load circuits, and an inner contact region 411, 421, 431, 441 formed by a narrower portion of the main contact 41, 42, 43, 44 that extends into the housing interior.

Moreover, the contactor comprises two movable contacts 61, 62 that are arranged on an actuator. The latter comprises a moving runner 22 and a coil 20. The runner 22 comprises a drive element 24 (not illustrated in the FIG. 1) and a contact carrier 26 that is coupled thereto and that comprises a first arm 12 on which the first movable contact 61 is arranged and a second arm 16 on which the second movable contact 62 is arranged. The actuator comprises moreover a coil 20 that when the coil is connected to a control circuit may be switched between an idle state in which no current is flowing and a state in which current is flowing. It is possible by virtue of changing the state of the coil to change the position of the runner 22 relative to the coil 20. In particular, it is thus possible to move the contact carrier 26 and consequently the movable contacts 61, 62 relative to the main contacts 41, 42, 43, and 44.

The first and second main contact 41, 42 and the first movable contact 61 form a first switching contact with a switching function for a load circuit that may be connected to the first and second main contact 41, 42. In a first switching state, the switching contact is closed and renders it possible for current to flow between the first and the second main contact 41, 42. In a second switching state, the switching contact is open and prevents current flowing between the first and second main contact 41, 42.

The third and fourth main contact 43, 44 and the second movable contact 62 form a second switching contact for a load circuit that may be connected to the third and fourth main contact 43, 44. In the first switching state, the switching contact is closed and renders it possible for current to flow between the third and fourth main contact 43, 44. In the second switching state, the switching contact is open and prevents current flowing between the third and fourth main contact 43, 44.

In the normal operating mode, the runner 22 and with it the movable contacts 61, 62 may be moved in a linear manner between a first position and a second position. In the first position, the first movable contact 61 is in the first switching state in which it is coupled in an electrically conductive manner between the first and the second main contact 41, 42. In the first position, the second movable contact 62 is in the first switching state in which it is coupled in an electrically conductive manner between the third and the fourth main contact 43, 44. In the second position—as is illustrated in FIG. 1—the first movable contact 61 is electrically isolated from the first and the second main contact 41, 42, and the second movable contact 62 is electrically isolated from the first and fourth main contact 43, 44. This is also referred to as the second switching state. By reason of their function, whereby they are able to bridge the spacing between the first and second main contact 41, 42 and the spacing between the third and fourth main contact 43, 44, the movable contacts 61, 62 may also be referred to as conductive bridges or only bridges.

In this exemplary embodiment, with the coil 20 in the idle state the runner 22 is in the second position and the movable contacts 61, 62 in the second switching state, in other words a conductive connection is not provided between the first and second main contact 41, 42 and between the third and fourth main contact 43, 44. In the case of a coil in which current is flowing, conductive connections are produced in that the movable contacts 61, 62 are moved toward the main contacts 41, 42, 43, 44.

Contactors in this application field are generally gas-filled, in other words hermetically sealed more specifically gas-tight with respect to the environment. The part of the runner 22 that is used as the contact carrier 26, the movable contacts 61, 62 and the inner contact regions 411, 421, 431, 441 are arranged in a hermetically therefore gas-tight sealed housing part that forms a gas-tight chamber 50. This chamber 50 may have a vacuum. Alternatively, it may be gas-filled, by way of example with sulphur hexafluoride.

As the movable contacts 61, 62 close and open, switching sparks occur that may result in the contacts becoming so hot that they become welded as they cool down. With the aid of two exemplary embodiments, it is exemplified below how one of the movable contacts 61, 62 may still be moved from the first into the second switching state even when the other movable contact 61, 62 is welded to one of the main contacts 41, 42, 43, 44, in other words is permanently connected thereto. This state may also be described clearly as an adhered state.

Figure 2A:
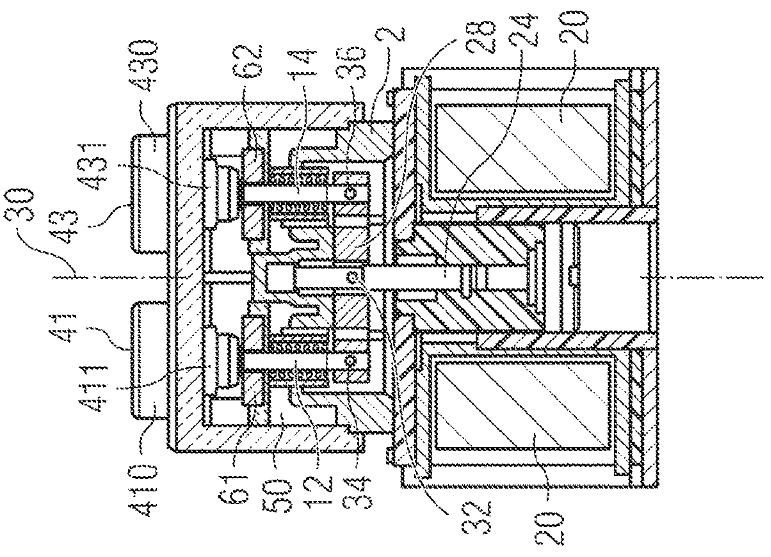
FIGS. 2A, 2B and 2C illustrate the sectional view of an exemplary embodiment of a double contactor in the closed state, in the open state and in the state where one of the movable contacts is welded to a main contact, wherein the other movable contact is open.
Figure 2B:
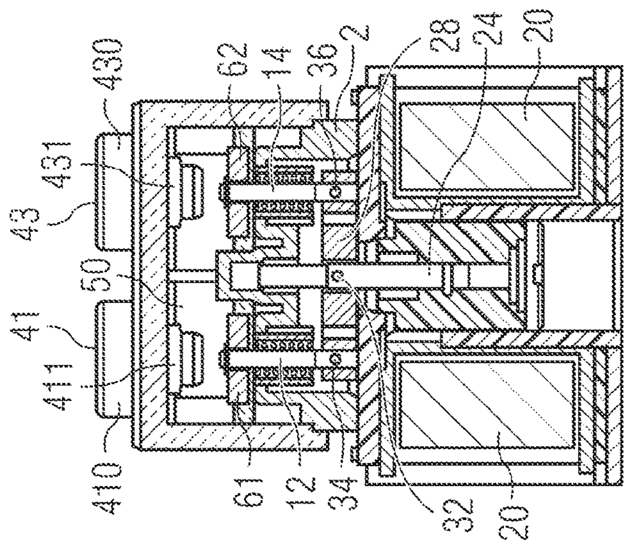
Figure 2C:
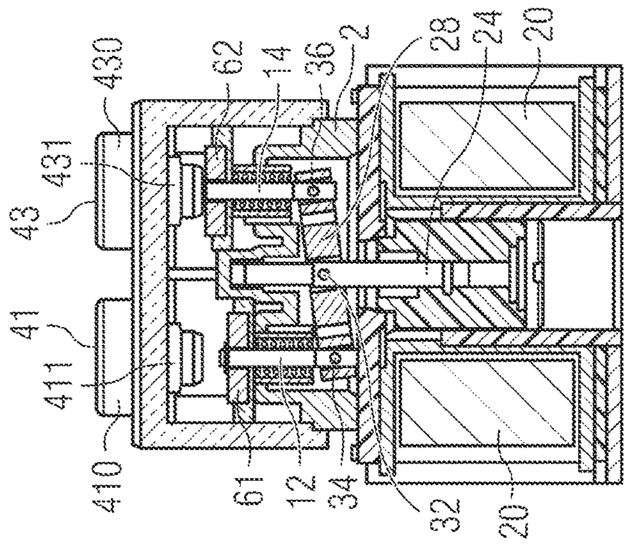

FIGS. 2A, 2B and 2C illustrate the sectional view of an exemplary embodiment of a double contactor in the closed state, in the open state and in the state where one of the movable contacts 61, 62 is welded to a main contact 41, 42, 43, 44, wherein the other movable contact 61, 62 is open. In this exemplary embodiment, the contact carrier 26 is rotatably mounted with the result that the term “seesaw arrangement” may clearly describe the concept.

The double contactor comprises a first switching contact having a first main contact 41 and having a second main contact 42 (not illustrated in FIGS. 2A, 2B, 2C) and having a first movable contact 61 and the double contactor comprises a second switching contact having a third main contact 43 and a fourth main contact 44 (not illustrated in FIGS. 2A, 2B, 2C) and having a second movable contact 62. The second switching contact is electrically isolated from the first switching contact. The main contacts 41, 42, 43, 44 have in each case an outer contact region 410, 420, 430, 440 to which are connected the load circuit or the load circuits, and an inner contact region 411, 421, 431, 441 for contacting the movable contacts 61, 62.

Moreover, the contactor comprises an actuator having a coil 20 and a runner 22. The runner 22 performs a translatory movement along the longitudinal axis 30 of the coil 20, the translatory movement depending upon the state of the coil 20. As the coil 20 is switched from the state in which current is flowing into the idle state, in other words the current-less state, the runner 22 moves along the longitudinal axis 30 toward the coil 20, in other words in FIG. 2A downwards. As the coil 20 is switched from the idle state into the state in which current is flowing the runner 22 moves along the longitudinal axis 30 away from the coil 20, in other words in FIG. 2A upwards.

The runner 22 comprises a shaft-shaped drive element 24, which moves at least in part in the coil interior, and a contact carrier 26 that is arranged thereon and has a carrier body 28 that extends transversely with respect to the longitudinal axis 30 and has a first and second arm 12, 14 on which the first and second movable contacts 61, 62 respectively are arranged. The carrier body 28 is connected via a joint 32 to the drive element 24. The joint 32 renders it possible for the carrier body 28 to perform a rotational movement transversely with respect to the longitudinal axis 30 but within the plane in which the arms 12, 14 move in the normal operating mode. The first and second arms 12, 14 are connected to the carrier body 28 via joints 34, 36. The joints 34, 36 render it possible for the arms 12, 14 to perform a rotational movement transversely with respect to the longitudinal axis 30.

Moreover, the contactor comprises a housing 2 in which the actuator and the movable contacts 61, 62 are arranged. The main contacts 41, 42, 43, 44 are mounted on the housing 2 in such a manner that the outer contact regions 410, 420, 430, 440 are arranged outside the housing 2 and the inner contact regions 411, 421, 431, 441 protrude into the housing interior. The coil 20 and a drive element 24 that protrudes into the coil 20 are arranged in the lower housing part. The upper housing part forms a gas-tight chamber 50 in which the movable contacts 61, 62 and the contact carrier 26 are moveably arranged. Also the inner contact regions 411, 421, 431, 441 protrude into this chamber 50. The chamber 50 may have a vacuum or may be gas-filled.

FIG. 2A illustrates the first and second switching contacts in the first switching state, in other words in the closed state, in the normal operating mode in which the movable contacts 61, 62 and the main contacts 41, 42, 43, 44 are not permanently connected to one another. The drive element 24 is in its first position. The first movable contact 61 is in the first switching state in which it is coupled in an electrically conductive manner between the first and the second main contact 41, 42. The second movable contact 62 is likewise in the first switching state in which it is coupled in an electrically conductive manner between the third and the fourth main contact 43, 44. Both the first and also the second switching contact are closed.

FIG. 2B illustrates the first and second switching contacts in the second switching state, in other words open, in the normal operating mode. The drive element 24 is in its second position. By virtue of transferring the coil 20 into the idle state, the runner 22 is moved toward the coil 20, in other words in FIG. 2B downward. As a result, the contract carrier 26 and with it the movable contacts 61, 62 are moved away from the main contacts 41, 42, 43, 44. Consequently, the first movable contact 61 is electrically isolated from the first and second main contact 41, 42 and the second movable contact 62 is electrically isolated from the third and from the fourth main contact 43, 44.

FIG. 2C illustrates a state in the event of a fault in which the second movable contact 62 is fused to the third and/or to the fourth main contact 43, 44 with the result that a permanent connection is produced. As a result, the second switching contact may no longer be transferred into the open state.

By virtue of transferring the coil 20 into the idle state, the runner 22 is also moved downward in this state. However, owing to the second movable contact 62 being permanently connected to the third and/or fourth main contact 43, 44, it is not possible for the second arm 14 and the second movable contact 62 to follow the translatory movement of the drive element 24. The longitudinal movement of the drive element 24 occurs simultaneously with a longitudinal movement of the carrier body 24, which leads to a rotational movement of the carrier body 28 since the second arm is unable to move. By virtue of the rotational movement, the first arm 12 and the first movable contact 61 are moved away from the first and second main contacts 41, 42. The joints 34, 36 between the arms 12, 14 and the carrier body 28 render it possible for the arms 12, 14 to perform a counter movement with respect to the rotational movement of the carrier body 28 with the result that the arms 12, 14 and the movable contacts 61, 62 do not tilt, which prevents tilting over.

By means of the rotatably mounted carrier body 28, it is still possible if only one of the movable contacts 61, 62 is permanently welded to one of the main contacts 41, 42, 43, 44 to move the other movable contact 61, 62 into the second switching position, in other words to open the corresponding switching contact even if this is no longer possible in the case of the other switching contact. By means of the rotatable mounting arrangement, a movable contact may be moved back into the open state in the event of the other movable contact becoming welded. If the contactor is inserted at two sites so as to protect the same load circuit, it is thus still always possible to interrupt the load circuit. Naturally, it is also possible using the contactor to protect two load circuits of which however subsequently only one would be interrupted.

Figure 3C:
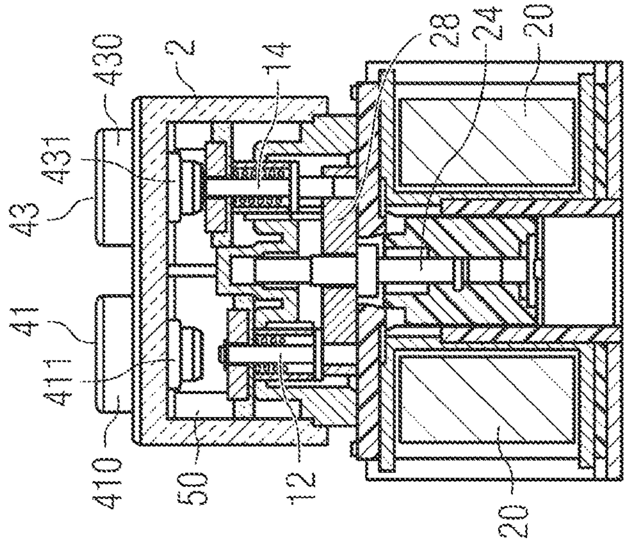
FIGS. 3A, 3B and 3C illustrate the sectional view of a further exemplary embodiment of a double contactor in the closed state, in the open state and in the state where one of the movable contacts is welded to a main contact, wherein the other movable contact is open.
Figure 3B:
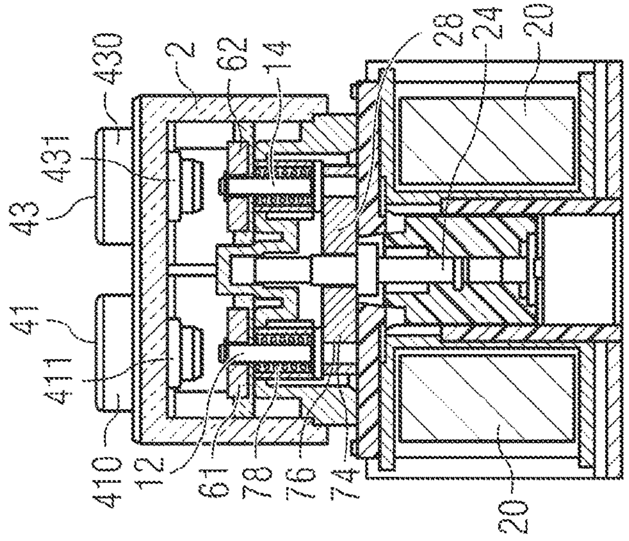
Figure 3A:
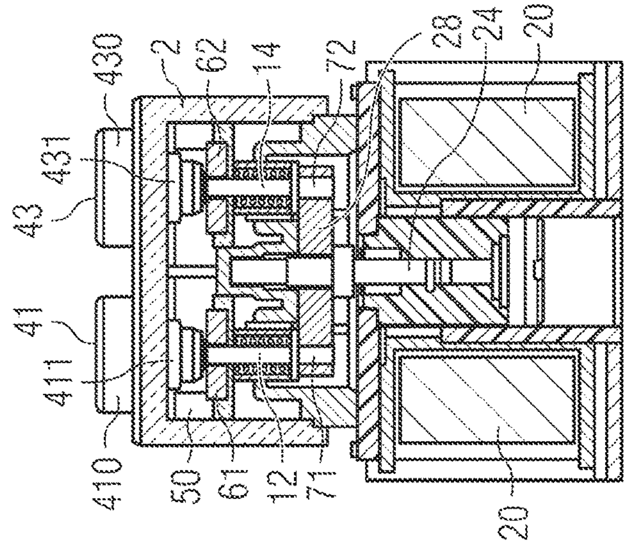

FIGS. 3A, 3B and 3C illustrate the sectional view of a further exemplary embodiment of a double contactor in the closed state, in the open state and in a state where one of the movable contacts is welded to a main contact, wherein the other movable contact is open. In this exemplary embodiment, the contact carrier is not rotatably mounted with the result that the term "bar arrangement" could clearly describe the concept. In order to avoid repetitions, the description concentrates on the differences with respect to the preceding exemplary embodiment.

The runner 22 comprises a shaft-shaped drive element 24 that moves in the coil interior and a contact carrier 26 that is arranged thereon and has a carrier body 28 that extends transversely with respect to the longitudinal axis 30 and has a first and second arm 12, 14 on which the first and second movable contacts 61, 62 respectively are arranged. The carrier body 28 is fixedly connected to the drive element 24. The first and second arms 12, 14 are connected to the carrier body 28 in such a manner that the arms may be deflected in the longitudinal direction. In this case, the arms 12, 14 are mounted in such a manner that they may be deflected in a linear manner, in particular may be extendible, during the transition from the first position into the second position but not during the transition from the second position into the first position. This clearly means that only as the drive element 24 moves toward the coil 20 do the arms need to follow the movement of the drive element. As the drive element 24 moves away from the coil 20, the arms 12, 14 move in harmony with the drive element 20. This may be realized by means of the arms 12, 14 being connected to the carrier body 28 via slider joints 71, 72. One region of the arms 12, 14, by way of example a spigot-shaped end region 74, may be arranged in a bush 76 in the carrier body 28. During the deflection procedure, the region may be moved at least in part out of the bush 76. The arm 12, 14 comprises a spring 78, the resilient force of which forces the arm 12, 14 into its non-deflected position with the result that in the normal operating mode in the non-extended position the arm remains in the bush 76, irrespective of whether the carrier body 28 is moved upward or downward.

FIG. 3A illustrates the first and second switching contacts in the first switching state in the normal operating mode in which the movable contacts 61, 62 and the main contacts 41, 42, 43, 44 are not permanently connected to one another. The drive element 24 is in its first position. The first movable contact 61 is in the first switching state in which it is coupled in an electrically conductive manner between the first and the second main contact 41, 42. The second movable contact 62 is likewise in the first switching state in which it is coupled in an electrically conductive manner between the third and the fourth main contact 43, 44. Both the first and also the second switching contact are closed.

FIG. 3B illustrates the first and second switching contacts in the second switching state in the normal operating mode. The drive element 24 is in its first position. By virtue of transferring the coil 20 into the idle state, the runner 22 is moved downward. As a result, the contract carrier 26 and with it the movable contacts 61, 62 are moved away from the main contacts 41, 42, 43, 44. Consequently, the first movable contact 61 is electrically isolated from the first and second main contact 41, 42 and the second movable contact 62 is electrically isolated from the third and from the fourth main contact 43, 44.

FIG. 3C illustrates a state in which the second movable contact 62 is fused to the third and/or fourth main contact 43, 44 with the result that a permanent connection is produced. As a result, the second switching contact is no longer transferred into the open state.

By virtue of transferring the coil 20 into the idle state, the runner 22 is also moved downward in this state. The longitudinal movement of the drive element 24 is performed simultaneously with a longitudinal movement of the carrier body 28 that also draws the arms having the movable contacts in this direction.

However, owing to the second movable contact 62 being permanently connected to the third and/or fourth main contact 43, 44, it is not possible for the second arm 14 and the second movable contact 62 to follow the translatory movement of the drive element 24. The second arm 14 is deflected. Its spigot-shaped end region 74 is drawn in part out of the bush 76 if the carrier body 26 moves downward. The arm is deflected against the resilient force if the carrier body 28 and with it the first movable contact 61 is moved toward the coil 20. It is thus possible to open the first switching contact even if the second switching contact remains closed.

The above described effect may naturally also occur conversely if only the first switching contact is welded.

The features of the exemplary embodiments may be combined. The invention is not limited by the description with the aid of the exemplary embodiments. On the contrary, the invention comprises each new feature and each combination of features which includes in particular each combination of features in the claims even if this feature or this combination itself is not explicitly disclosed in the claims or exemplary embodiments.

The invention claimed is:

1. A relay comprising:

a first switching contact having a first main contact, a second main contact and a first movable contact;

a second switching contact having a third main contact, a fourth main contact and a second movable contact, wherein the second switching contact is electrically isolated from the first switching contact; and an actuator comprising a movable runner and a coil, wherein the runner comprises a drive element and a contact carrier coupled to the drive element and comprising a first arm, on which the first movable contact is arranged and a second arm on which the second movable contact is arranged, wherein the actuator is configured to move both the first and second movable contacts from a first switching state into a second switching state by moving the drive element from a first position into a second position, wherein, in a normal operating mode, the movable contacts and the main contacts are not permanently connected to one another, wherein, in the first switching state, the first movable contact is coupled in an electrically conductive manner between the first and second main contacts and the second movable contact is coupled in an electrically conductive manner between the third and fourth main contacts, wherein, in the second switching state, the first movable contact is electrically isolated from the first and second main contacts and the second movable contact is electrically isolated form the third and fourth main contacts, wherein the actuator is further configured to move one of the movable contacts from the first switching state into the second switching state by moving the drive element from the first position in a direction of the second position in an event of a fault in which one of the movable contacts is permanently connected to one of the main contacts, and wherein the runner and with it the first movable contact and the second movable contact is configured to perform, depending on the state of the coil, a translatory movement along a longitudinal axis of the coil between the first position and the second position.

2. The relay according to claim 1, wherein the contact carrier is coupled to the drive element so that, in the normal operating mode during a transition from the first position into the second position, the arms are coupled to a movement of the drive element and, in the event of the fault during a transition from the first position in the direction of the second position, an arm, on which the movable contact permanently connected to one of the main contacts is arranged, is decoupled from the movement of the drive element.

3. The relay according to claim 2, wherein the drive element and the contact carrier with the first and second arms are configured to perform a linear movement during the transition from the first position into the second position in the normal operating mode.

4. The relay according to claim 2, wherein the drive element and a carrier body of the contact carrier on which the arms are arranged are coupled via a joint so that they are configured to perform a linear movement in the normal operating mode and so that the carrier body is configured to perform a rotational movement simultaneously with the linear movement of the drive element in the event of the fault.

5. The relay according to claim 4, wherein the arms are mounted such that they are configured to perform a counter movement with respect to the rotational movement of the carrier body.

6. The relay according to claim 4, wherein each arm is coupled to the carrier body via a joint.

7. The relay according to claim 2, wherein the arms are mounted such that they are configured to be deflected in a linear manner during the transition from the first position into the second position but not during the transition from the second position into the first position.

8. The relay according to claim 7, wherein the arm, on which the movable contact permanently connected to one of the main contacts is arranged, is configured to not follow or to not completely follow a linear movement of the drive element in the event of the fault.

9. The relay according to claim 7, wherein the arms are coupled to a carrier body such that the arms are extendible.

10. The relay according to claim 7, wherein each arm is coupled to a carrier body via a joint.

11. The relay according to claim 7, wherein a spring is configured to counteract a deflection of the arms.

12. The relay according to claim 2, wherein the arm, on which the movable contact permanently connected to one of the main contacts is arranged, is configured to not follow or to not completely follow a linear movement of the drive element in the event of the fault.

13. The relay according to claim 2, wherein the arms are coupled to a carrier body such the arms are extendible.

14. The relay according to claim 2, wherein each arm is coupled to a carrier body via a joint.

15. The relay according to claim 2, wherein a spring is configured to counteract a deflection of the arms.

16. The relay according to claim 1, wherein the coil is configured to be switched from an idle state into a state in which current flows, and wherein the position of the drive element depends upon the state of the coil.

17. The relay according to claim 1, further comprising a gas-tight housing chamber in which the movable contacts are arranged.

18. The relay according to claim 1, wherein the fault occurs as a result of one of the main contacts welding to one of the moving contacts as a result of switching sparks.

* * * * *